UNITED STATES PATENT OFFICE.

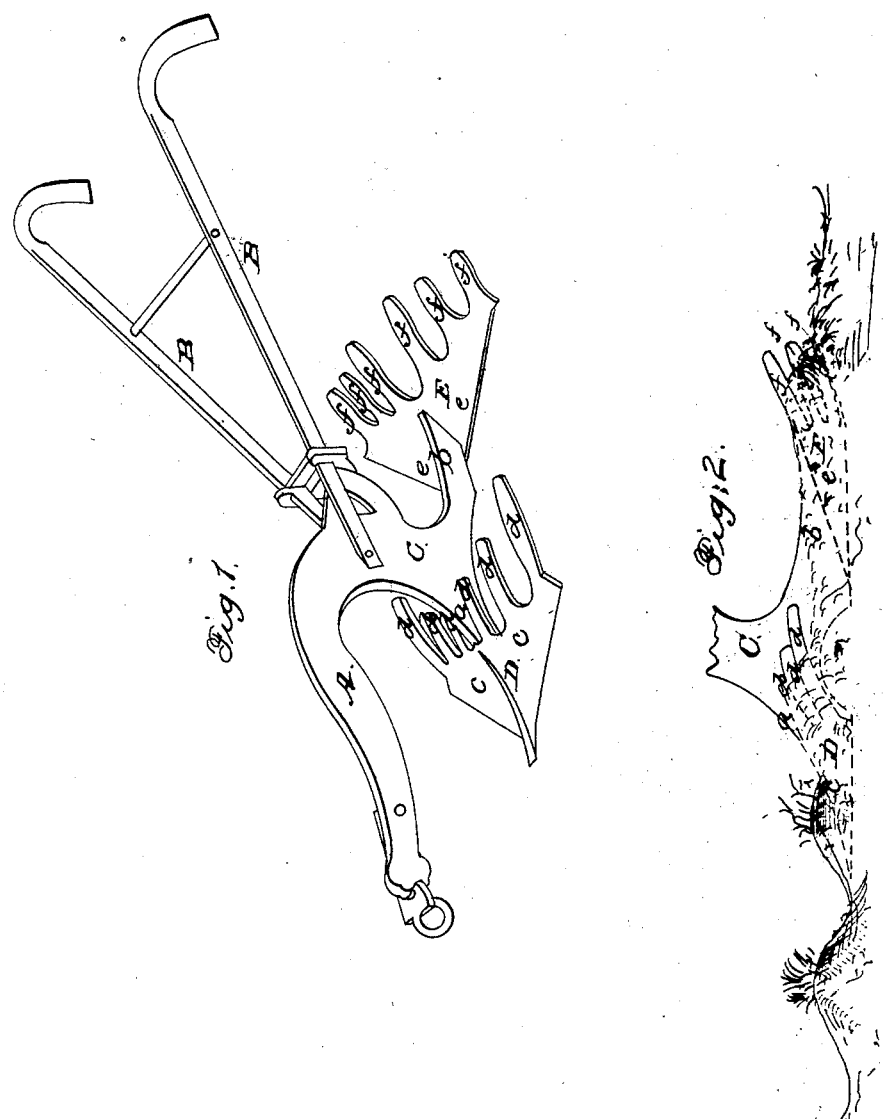

JOHN BAWDEN, OF FREEHOLD, NEW JERSEY, ASSIGNOR TO GILBERT COMBS, OF SAME PLACE.

IMPROVEMENT IN POTATO-DIGGERS.

Specification forming part of Letters Patent No. 28,232, dated May 8, 1860.

*To all whom it may concern:*

Be it known that I, JOHN BAWDEN, of Freehold, in the county of Monmouth and State of New Jersey, have invented a new and Improved Potato-Digger; and I do hereby declare that the following is a full, clear, and exact description of the same, reference being had to the annexed drawings, making a part of this specification, in which—

Figure 1 is a perspective view of my invention, showing its construction; Fig. 2, a side view of the same, showing its operation.

Similar letters of reference indicate corresponding parts in the two figures.

This invention consists in the employment or use of two double-mold-board plows provided with teeth at their back ends, and attached to one and the same foot or standard in such a way as to act consecutively, or one after the other, the front plow, as the implement moves along, opening the hills or drills and partially elevating the potatoes, and the back plow fully elevating the same and leaving them on the surface of the loose earth behind the implement.

To enable those skilled in the art to fully unstand and construct my invention, I will proceed to describe it.

A represents a beam, to the back part of which two handles, B B, are attached, the back part of the beam being curved downward to form a foot or standard, C, and having its lower end divided into two parts, *a b*, one projecting forward and the other backward, as shown clearly in Fig. 1. To the front end of the part *a* of the foot a double-mold-board plow, D, is attached. The front parts, *c c*, of the plow are of usual form or construction, but the back parts have teeth or prongs *d*, similar to a rake, as shown in both figures.

To the back part, *b*, of the foot or standard a double-mold-board plow, E, is attached. This plow is formed similarly to the front one, D, the front part of its mold-boards *e e* being of usual construction and the back parts provided with teeth or prongs *f*. Both plows D E have their bottoms or soles in the same horizontal plane; but their mold-boards have a gradual inclination, so as to allow the earth to pass over them instead of being much cast aside, as the object is to open the hills or drills and scoop up the contents—that is to say, the potatoes—and not to scatter them to the right and left. To effect this result, therefore, the mold-boards require to be but slightly inclined and the solid or front parts of the plows not very deep or long.

The beam A, with its foot and plows, may all be cast in one piece. The handles B B may be attached to the beam A in any proper way, they being made separate and of either metal or wood. The latter material will probably be most generally used.

The operation is as follows: As the implement is drawn along, the front plow, D, opens the hills or drills and elevates the potatoes and earth, the same passing over the mold-boards of the plow and over and between the teeth *d*, which serve to partially separate the potatoes from the loose earth, the potatoes naturally having an elevated position, as the earth falls quickest. The front plow therefore chiefly opens the hills or drills and spreads out and partially elevates the potatoes directly in front of plow E, which, by repeating the operation of plow D, fully elevates the potatoes and leaves them on the surface of the ground behind.

It is well known that the passage of a toothed implement—such as a combined rake or screen and plow—through the ground, so as to open the hills or drills of potatoes, will cause the latter to be elevated near the surface, as any agitation of the earth and potatoes causes the latter to be elevated, the earth falling quicker in consequence of its superior gravity. One plow and rake, however, will not answer the purpose. The operation must be repeated in order to fully and thoroughly accomplish the work, and to this end I employ the two plows provided each with the teeth or prongs, as shown and described.

I am aware that double-mold-board plows have been constructed with teeth or prongs for the purpose herein specified, and I therefore do not claim such device, broadly and separately; but I do claim as new and desire to secure by Letters Patent—

The employment or use of the two plows D E, provided with the teeth or springs *d f* and applied to the foot or standard C of the beam A, substantially as and for the purpose set forth.

JOHN BAWDEN.

Witnesses:
W. D. OLIPHANT,
JAS. B. PARKER.